US007346980B2

(12) United States Patent
Liao

(10) Patent No.: US 7,346,980 B2
(45) Date of Patent: Mar. 25, 2008

(54) PRESS-CONNECTING HEAD OF PRESS-CONNECTING PLIERS FOR COAXIAL TERMINAL

(75) Inventor: Chien-Chou Liao, Taipei Hsien (TW)

(73) Assignee: Hanlong Industrial Co., Ltd., Taipei Hsien (TW)

( * ) Notice: Subject to any disclaimer, the term of this patent is extended or adjusted under 35 U.S.C. 154(b) by 393 days.

(21) Appl. No.: 11/037,111

(22) Filed: Jan. 19, 2005

(65) Prior Publication Data

US 2006/0156541 A1 Jul. 20, 2006

(51) Int. Cl.
*B23P 19/00* (2006.01)
*B21D 37/00* (2006.01)

(52) U.S. Cl. ........................... 29/758; 29/750; 29/751; 29/761; 29/762; 72/412

(58) Field of Classification Search ................. 29/751, 29/758, 750, 761, 861, 882, 868, 760, 862; 72/412, 413, 488, 409, 409.14, 409.16; 81/439, 81/438, 367, 349, 340
See application file for complete search history.

(56) References Cited

U.S. PATENT DOCUMENTS 3,633,400 A * 1/1972 Wunder ................... 72/409.08
5,211,049 A * 5/1993 Lucas .......................... 29/751
5,236,331 A * 8/1993 Liu ............................. 72/461
5,277,051 A * 1/1994 Liu ......................... 72/409.14
5,392,508 A * 2/1995 Holliday et al. .............. 29/751
5,596,800 A * 1/1997 Holliday et al. .............. 29/751
5,647,119 A * 7/1997 Bourbeau et al. ............. 29/751
5,913,933 A * 6/1999 Beetz et al. ............. 72/409.16
6,272,738 B1 * 8/2001 Holliday et al. .............. 29/751

* cited by examiner

*Primary Examiner*—A. Dexter Tugbang
*Assistant Examiner*—Tai Van Nguyen
(74) *Attorney, Agent, or Firm*—Bacon & Thomas, PLLC

(57) ABSTRACT

A press-connecting head of a pair of press-connecting pliers for connecting a coaxial terminal, it is composed of an inserting/retracting member and two pressing dies respectively provided on two mutually opposite sides of the inserting/retracting member; wherein the inserting/retracting member is assembled with the press-connecting pliers by an inserting mode, hence by a simple action of inserting/retracting, different pressing dies of the same press-connecting head can be mutually changed to be exactly aligned with a fixed block, or the press-connecting head can be changed for another one with pressing dies of other specifications. And then the press-connecting pliers using the press-connecting head structure can allow execution of press-connecting operation of the coaxial terminals of different specifications with a coaxial signal line; thus the range of application of the press-connecting pliers can be enlarged.

6 Claims, 5 Drawing Sheets

PRESS-CONNECTING HEAD OF PRESS-CONNECTING PLIERS FOR COAXIAL TERMINAL

BACKGROUND OF THE INVENTION

1. Field of the Invention

The present invention is related to an improved press-connecting head structure of a pair of press-connecting pliers for connecting a coaxial terminal, and especially to an improved press-connecting head structure of which the press-connecting head can be used on a BNC type coaxial terminal, an RCA type coaxial terminal and an F type coaxial terminal, or used on F type coaxial terminals of different specifications to press-connect with a coaxial signal line through a simple action of inserting/retracting, thereby the range of application of a pair of press-connecting pliers can be enlarged.

2. Description of the Prior Art

As shown in FIGS. 1-3 that are drawings showing the types of various normally used coaxial terminals for coaxial signal lines at the present time; the types of terminals at least include the F type coaxial terminal 10 shown in FIG. 1, the BNC type coaxial terminal 20 shown in FIG. 2 and the RCA type coaxial terminal 30 shown in FIG. 3. Wherein the difference among these types of coaxial terminals mainly is due to the demand of mating with equipment they are to connect, thus different types of connectors are formed. However basically, the connecting structure for coaxial terminals and coaxial signal lines does not have any evident change; similarly, the coaxial signal lines are directly press fixed on the tailing ends of the coaxial terminals by direct pressing in for connecting.

A pair of press-connecting pliers used to press connect a coaxial signal line with a coaxial terminal are provided with a fixed block and a press-connecting head; when the coaxial terminal and the tailing end of the coaxial signal line are placed between the fixed block and the press-connecting head of the of press-connecting pliers, handles are pressed to render the press-connecting head to move toward the fixed block, then the coaxial terminal and the coaxial signal line can be press connected and fixed.

However, the coaxial terminals stated above at least include the RCA type coaxial terminals, the BNC type coaxial terminals and the F type coaxial terminals, they are very different by appearance as are the shapes shown in FIGS. 1-3; and even connecting heads of same type have different specifications by size, this makes the press-connecting head used on a pair of conventional press-connecting pliers for a coaxial terminal able to only do press connecting on a single coaxial terminal, thereby the press-connecting pliers are limited in their range of application.

SUMMARY OF THE INVENTION

The press-connecting head of a pair of press-connecting pliers for connecting a coaxial terminal of the present invention basically is composed of an inserting/retracting member and two pressing dies; wherein the inserting/retracting member is assembled with the press-connecting pliers by an inserting mode, while the two pressing dies can be pressing dies with two different specifications suitable for using respectively on a BNC/RCA type coaxial terminal and an F type coaxial terminal, or can be two pressing dies with two different specifications suitable for using respectively on F type coaxial terminals with different specifications.

Thereby, by a simple action of inserting/retracting, different pressing dies of the same press-connecting head can be mutually changed to be exactly aligned with a fixed block, or the press-connecting head can be changed for another one with pressing dies of other specifications. When a user operates the press-connecting pliers to make the entire press-connecting head displace toward the fixed block, he can press connect and fix any kind of the abovementioned coaxial terminals and the coaxial signal line; and then the press-connecting pliers using the press-connecting head structure of the present invention can allow execution of press-connecting operation of the coaxial terminals of different specifications with the coaxial signal line; thereby the range of application of a pair of press-connecting pliers can be enlarged.

The present invention will be apparent in its combination of structure and its entire mode of operation after reading the detailed description of the preferred embodiment thereof in reference to the accompanying drawings.

DETAILED DESCRIPTION OF THE PREFERRED EMBODIMENT

Figure 1:
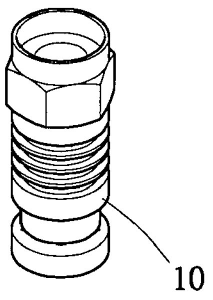
FIG. 1 (PRIOR ART)
FIG. 1 is a perspective view showing the appearance of a normally called F type coaxial terminal.
Figure 2:
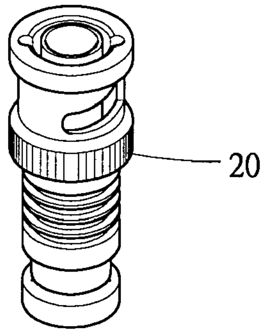
FIG. 2 (PRIOR ART)
FIG. 2 is a perspective view showing the appearance of a normally called BNC type coaxial terminal.
Figure 3:
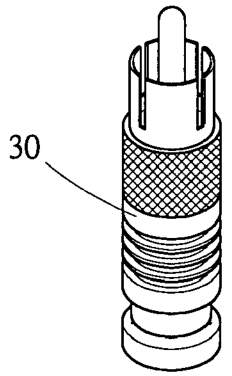
FIG. 3 (PRIOR ART)
FIG. 3 is a perspective view showing the appearance of a normally called RCA type coaxial terminal.
Figure 4:
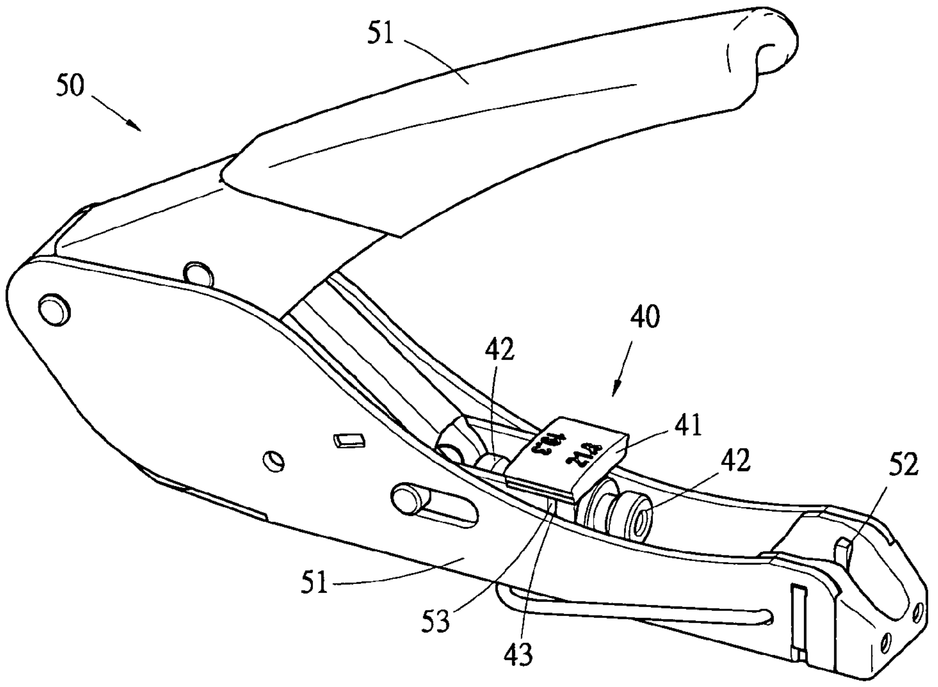
FIG. 4 is a perspective view showing allocation of the press-connecting head within an included angle of two handles of the press-connecting pliers of the present invention.
Figure 5:
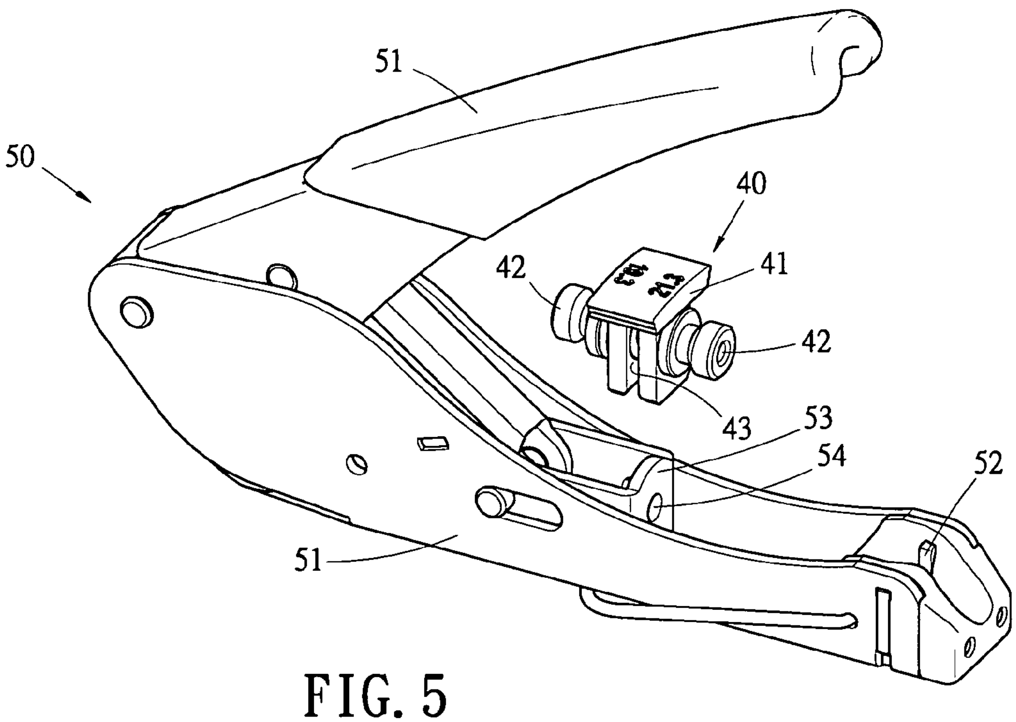
FIG. 5 is an anatomic perspective view showing the structure between the press-connecting head and the press-connecting pliers of the present invention.

The basic structure of a press-connecting head 40 of a pair of press-connecting pliers for a coaxial terminal of the present invention is shown as in FIGS. 4 and 5, and mainly comprises an inserting/retracting member 41 and two pressing dies 42 of different specifications. Wherein:

The inserting/retracting member 41 is assembled on the press-connecting pliers 50 by an inserting mode at a position in juxtaposition with a fixed block 52 of the press-connecting pliers 50, the two pressing dies 42 are provided respectively on corresponding ends of the inserting/retracting member 41, in order that when in use, one of the pressing dies 42 of the press-connecting head 40 exactly is aligned with a fixed block 52 of the press-connecting pliers 50; the press-connecting head 40 and the press-connecting pliers 50 are provided therebetween with connecting means adapted for connecting with each other, the connecting means are provided with engaging means; the orientation of the inserting/retracting member 41 can be changed through inserting and retracting, then another pressing die 42 is exactly aligned with the fixed block 52.

Figure 6:
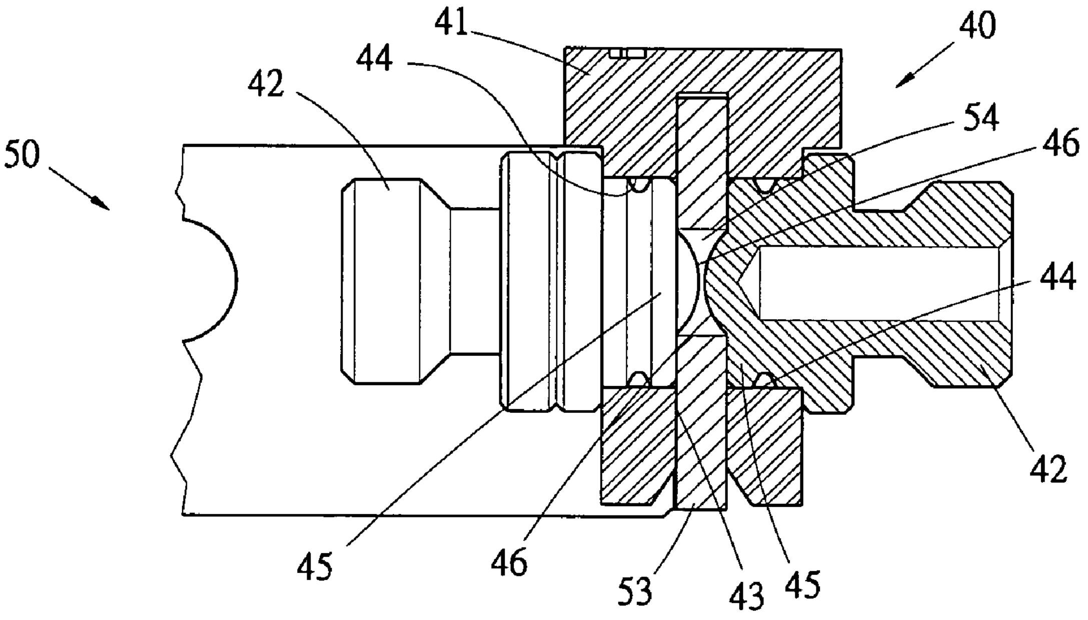
FIG. 6 is a schematic sectional view of the press-connecting head of a first embodiment of the present invention.

In practicing, such as are shown in FIGS. 5 and 6, the connecting means of the press-connecting head 40 is an insertion slit 43 provided on the inserting/retracting member 41, while the connecting means of the press-connecting pliers 50 is a plate 53 insertable into the insertion slit 43. The two pressing dies 42 of the press-connecting head 40 are fixedly provided at the two lateral sides of the insertion slit 43, and the press-connecting head 40 is provided on the two lateral sides of the insertion slit 43 with recesses 44, while the two pressing dies 42 are provided with insertion ends 45 that can be fixedly insertion connected with the recesses 44; the insertion ends 45 of the two pressing dies 42 are provided with protrusions 46 extending into the insertion slit 43, while the press-connecting pliers 50 is provided on the plate 53 extending into the insertion slit 43 with a slot 54 for extending in of the protrusions 46, thus the protrusions 46 and the slot 54 function as an engaging means of the press-connecting head 40 with the press-connecting pliers 50.

Figure 7:
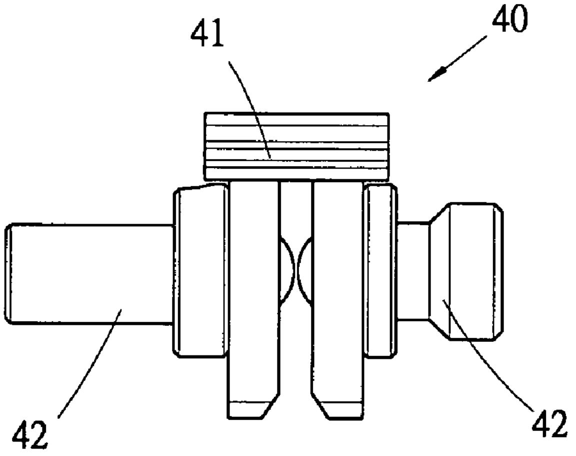
FIG. 7 is a schematic sectional view of the press-connecting head of a second embodiment of the present invention.

And more, the two pressing dies 42 on the inserting/retracting member 41 can be, as are shown in FIGS. 4-6, two pressing dies 42 with two different specifications suitable respectively for using on F type coaxial terminals with different specifications, or as is shown in FIG. 7, can be two pressing dies 42 with two different specifications suitable respectively for using on a BNC/RCA type coaxial terminal (the left one in the drawing) and an F type coaxial terminal (the right one in the drawing) to be selected by a user in use.

Therefore, by a simple action of inserting/retracting, different pressing dies 42 of the same press-connecting head 40 can be mutually changed to be exactly aligned with the fixed block 52, or the press-connecting head 40 can be changed for another one with pressing dies of other specifications; so that the entire press-connecting pliers 50 can be suitable for using on coaxial terminals with different specifications. When the user operates the press-connecting pliers 50 to make the entire press-connecting head 40 displace toward the fixed block 52, he can press connect and fix any kind of the abovementioned coaxial terminals and the coaxial signal line; and then the press-connecting pliers 50 using the press-connecting head structure of the present invention can allow execution of press-connecting operation of the coaxial terminals of different specifications with the coaxial signal line.

Figure 8:
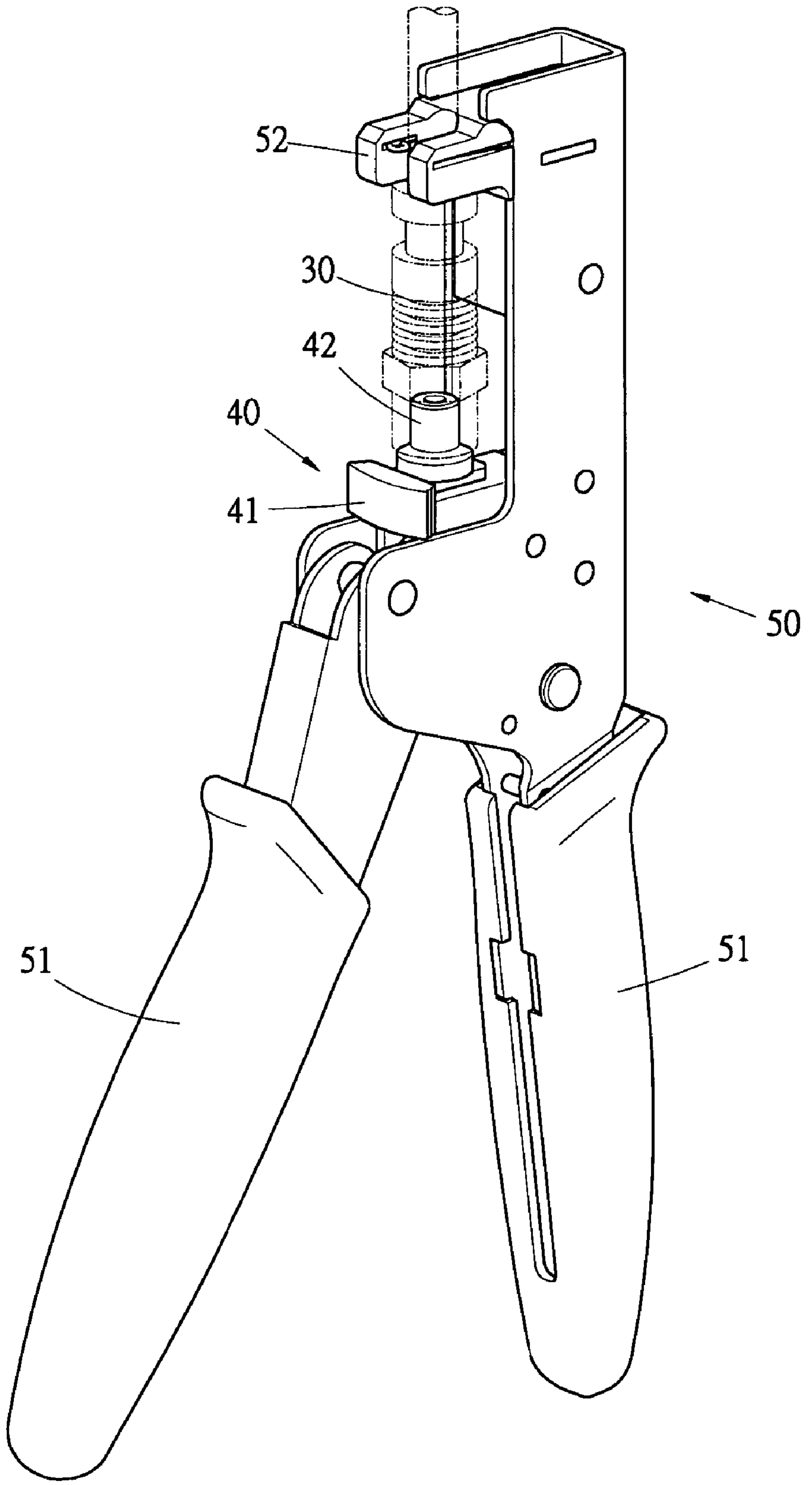
FIG. 8 is perspective view showing the appearance of the press-connecting pliers of the present invention with their press-connecting head provided outside of an included angle of two handles.
Figure 9:
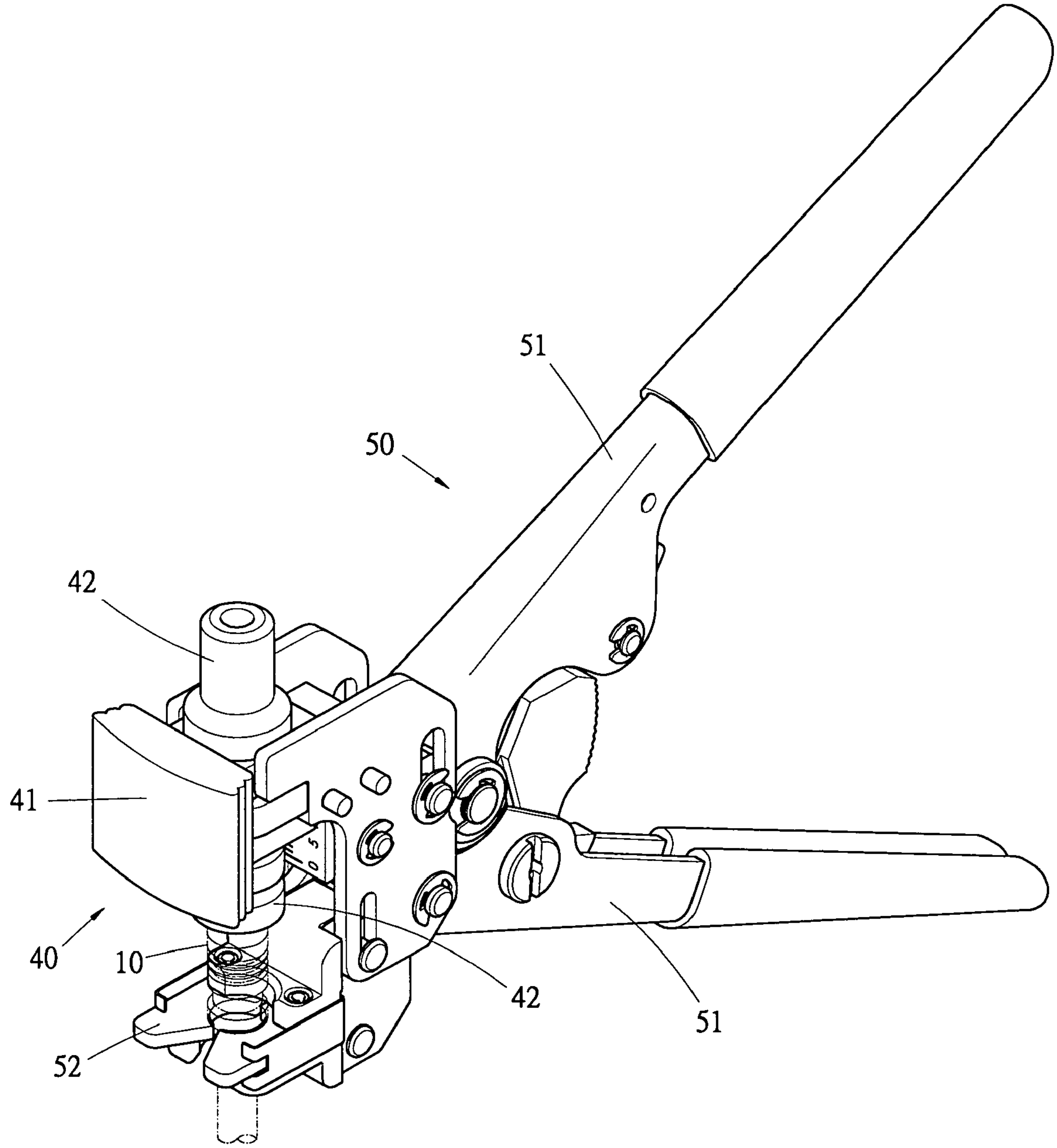
FIG. 9 is perspective view showing the appearance of another pair of press-connecting pliers of the present invention with their press-connecting head provided outside of an included angle of two handles.

One thing is worth mentioning, in the embodiment shown in FIGS. 4 and 5, the press-connecting head 40 of the press-connecting pliers 50 is allocated within an included angle of two handles 51 to form a stated of holding by compressing. Surely the press-connecting pliers 50 can also be of the structure like the case as shown in FIGS. 8 and 9, wherein the press-connecting head 40 is allocated outside of an included angle of the two handles 51, likely, the press-connecting pliers 50 is operated by pressing the two handles 51, by linking up of related elements, the press-connecting head 40 correspondingly gets close to the fixed block 52 to complete the press clamping mode of the coaxial signal line and the coaxial terminals.

Accordingly, the present invention renders the press-connecting head to be changed into a structural form suiting press connecting coaxial terminals, it has a function of enlarging the range of application of a pair of press-connecting pliers; however, the embodiment and description given are only for illustrating the present invention and not for giving any limitation to the scope of the present invention. It will be apparent to those skilled in this art that various equivalent modifications or changes without departing from the spirit of this invention shall also fall within the scope of the appended claims.

The invention claimed is:

1. A press-connecting head of a pair of press-connecting pliers for a coaxial terminal, said press-connecting head comprises:

an inserting/retracting member assembled on said press-connecting pliers by an inserting mode at a position in juxtaposition with a fixed block of said press-connecting pliers, and two pressing dies with different specifications provided respectively on two mutually opposite sides of said inserting/retracting member;

one of said two pressing dies on said inserting/retracting member is aligned with said fixed block; and by changing orientation of said inserting/retracting member together with said two pressing dies through inserting and retracting, another of said pressing dies is aligned with said fixed block; wherein said press-connecting head and said press-connecting pliers are provided therebetween with connecting means adapted for connecting with each other, said connecting means are provided with engaging means; and wherein said connecting means of said press-connecting head is an insertion slit provided on said inserting/retracting member, while said connecting means of said press-connecting pliers is a plate to be inserted into said insertion slit, said two pressing dies are fixedly provided at two lateral sides of said insertion slit.

2. The press-connecting head of a pair of press-connecting pliers for a coaxial terminal as defined in claim 1, wherein:

said inserting/retracting member is provided on said two lateral sides of said insertion slit with recesses, while said two pressing dies are provided with insertion ends to be fixedly insertion connected with said recesses; said insertion ends of said two pressing dies are provided with protrusions extending into said insertion slit, while said press-connecting pliers is provided on said plate extending into said insertion slit with a slot for extending in of said protrusions, thus said protrusions and said slot function as an engaging means of said press-connecting head with said press-connecting pliers.

3. The press-connecting head of a pair of press-connecting pliers for a coaxial terminal as defined in claim 1, wherein:

said press-connecting head is provided within an included angle of two handles of said press-connecting pliers.

4. The press-connecting head of a pair of press-connecting pliers for a coaxial terminal as defined in claim 1, wherein: said press-connecting head is provided outside of an included angle of two handles of said press-connecting pliers.

5. The press-connecting head of a pair of press-connecting pliers for a coaxial terminal as defined in claim 1, wherein: said two pressing dies are suitable for using respectively on F type coaxial terminals with different specifications.

6. A press-connecting head of a pair of press-connecting pliers for a coaxial terminal, said press-connecting head comprises:

an inserting/retracting member assembled on said press-connecting pliers by an inserting mode at a position in juxtaposition with a fixed block of said press-connecting pliers, and two pressing dies with different specifications provided respectively on two mutually opposite sides of said inserting/retracting member;

one of said two pressing dies on said inserting/retracting member is aligned with said fixed block; and by changing orientation of said inserting/retracting member together with said two pressing dies through inserting and retracting, another of said pressing dies is aligned with said fixed block;

wherein: said two pressing dies are suitable for using respectively on a BNC/RCA type coaxial terminal and an F type coaxial terminal.

* * * * *